June 27, 1961 A. F. STANDING ET AL 2,990,481

SHAPED PULSE MODULATOR

Filed March 27, 1958

WITNESSES

INVENTORS

Arthur F. Standing and

Coleman J. Miller

BY

ATTORNEY

United States Patent Office 2,990,481

Patented June 27, 1961

2,990,481
SHAPED PULSE MODULATOR

Arthur F. Standing, Baltimore, and Coleman J. Miller, Rock Hill Beach, Md., assignors to Westinghouse Electric Corporation, East Pittsburgh, Pa., a coporation of Pennsylvania Filed Mar. 27, 1958, Ser. No. 724,394
6 Claims. (Cl. 307—108)

This invention relates to shaped pulse modulators for developing voltage pulses to modulate such as a radar transmitter. More particularly, the invention relates to a circuit arrangement for producing desired electrical pulses of high power and complex shape, other than square, for modulation of such as a radar transmitter.

It is well known that the generation of complex shaped pulses at high power can be achieved with line type pulsers, but the pulse shapes produced by this means are very severely limited. Hard tube pulsers can be employed, but these are very inefficient and are limited in voltage and power.

It is, therefore, a prime object of the present invention to provide a circuit arrangement for generating complex shaped pulses which employs conventional soft tubes and provides good efficiency.

Another object of the present invention resides in the provision of means whereby a plurality of exponentially decaying sine waves may be produced from a direct current source and integrated to produce a complex shaped pulse.

A further object of the present invention resides in the provision of a plurality of components for producing from a direct current source, respective exponentially decaying sine waves, and a transformer connected to such components to afford different degrees of damping of the sine waves, to provide a 180° phase shift between certain of the sine waves, and to integrate the sine waves to produce a complex pulse shape.

Still another object of the present invention resides in the provision of means for producing high power pulses of $\sin^2$ shape.

Figure 1:
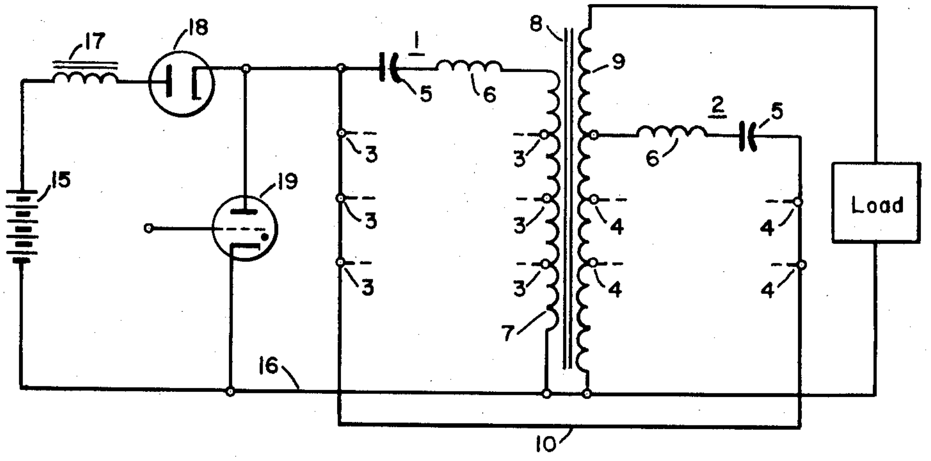
Figure 2:
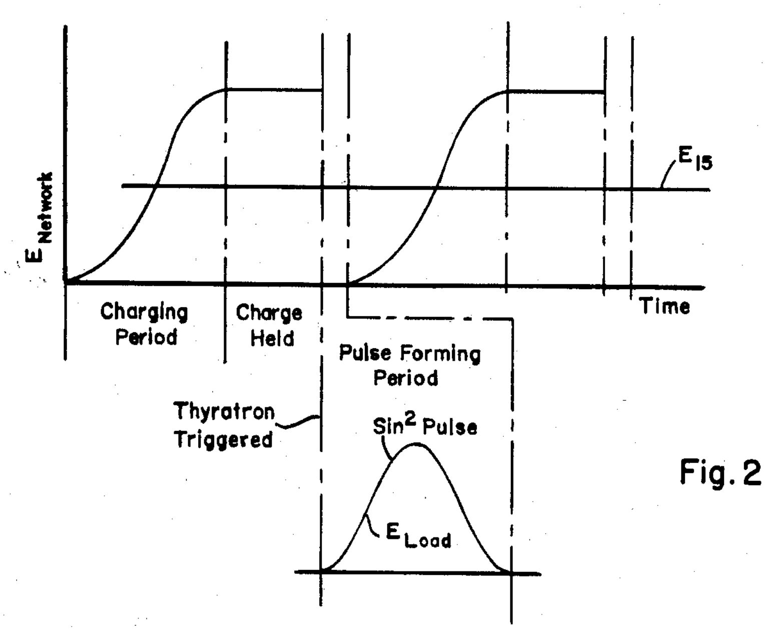

Other objects and advantages of the present invention will become more apparent to those skilled in the art from the following detailed description when taken in connection with the accompanying drawing, wherein:

FIGURE 1 is a circuit diagram showing the present invention for generating complex shaped voltage pulses; and FIG. 2 shows a group of curves representing typical voltage variations present in the circuit arrangement shown in FIG. 1 when employed for producing $\sin^2$ voltage pulses.

Referring to FIG. 1 in the drawing, the novel pulse shaping portion of the pulse generator circuit includes a plurality of LC branches, each having a capacitor 5 and an inductance coil 6 connected in series, the values of such components being selected for producing sine waves of a desired frequency, and the frequencies of the waves of the different branches being selected according to those required to produce the desired pulse shape, as will be apparent from subsequent description.

The number of LC branches for producing the sine waves of different frequencies which are integrated to produce the desired pulse is dependent in part upon the shape of such pulse and in part upon the degree of refinement desired for such shape. The present invention has been illustrated in connection with the generation of a $\sin^2$ pulse shape and only two LC branches 1 and 2 have been found to be necessary for this purpose. Taps 3 and 4 have been shown to indicate that other LC branches may be included in the primary and/or secondary where necessary to further refine the pulse shape or produce other shapes.

A portion of the LC branches, LC branch 1, for example, is tapped at a point or points, according to number of branches, into the primary winding 7 of a transformer 8, and a second portion of the LC branches, LC branch 2, for example, is tapped at a point or points, according to number of branches, into the secondary winding 9 of transformer 8. The several LC branches, 1, 2, chosen in number by way of example, are connected to a conductor 10 which is common to each.

The secondary winding 9 is connected at one end to the corresponding end of the primary winding 7 and is connected in series with a load, such as a radar transmitter for pulse modulation of same.

For charging the capacitors 5 in the LC branches from a direct current voltage source 15, components for resonant charging have been shown, although it will be understood that other systems of charging, such as alternating current charging, may be employed. For such resonant charging, the negative side of a direct current source 15 is connected to the common end of the primary and secondary windings 7 and 9 via a conductor 16, and the positive side of the source 15 is connected to the conductor 10 via a charging choke 17, the inductance of which is chosen to resonate with the total capacitance of the circuit substantially at the repetition frequency for the pulses generated. A diode 18 is connected in series with the choke 17 to serve the usual purpose of holding the charge in the capacitors 5 during the interval between pulses, and a thyratron tube 19 is connected between conductors 10 and 16 to act as a switch for controlling discharge of the capacitors 5.

In operation of the pulse generator embodying the invention, during the charging period when the thyratron tube 19 is non-conductive, the network will be charged as indicated by the respective curve shown in FIG. 2 by current flow from the source 15 via the circuit including the choke 17, diode 18, conductor 10, the LC branches, the respective windings of the transformed 8 and the conductor 16. Subsequent to this, the charge in the capacitors 5 will be held until the thyratron tube 19 is fired by application of a suitable trigger pulse to its grid, at which time the capacitors 5 in the LC branches will discharge through a circuit including their associated inductance coils 6, the windings 7 and 9 of the transformer 8, a portion of the conductor 16, thyratron tube 19 and conductor 10, as a voltage pulse is produced across the load.

The different sine waves appearing across the LC branches vary in magnitude according to the value of their capacitance and the inductance and the degree of dampening of such waves is governed by the point at which the LC branches are tapped into the transformer 9. The voltage pulse $\sin^2$ as exemplified in FIG. 2, appearing across the load, is the result of the combining of the different exponentially-decaying sine waves from the LC branches, as influenced by their amplitude, frequency, and a phase inversion as seen by the load between the waves appearing across the LC branches tapped into the primary winding 7 and the waves appearing across the LC branches tapped into the secondary winding 9 acting as an autotransformer with respect to the load.

By feeding the higher frequency waves into the secondary winding 9, the transformer 8 can be made with less cost, since it is easier to obtain low leakage inductance in an autotransformer.

From the foregoing it will be apparent that a wide range of pulse shapes can be produced by the generator constructed in accord with the present invention by changing the frequency, number and location of the different exponentially-decaying sine waves fed into the transformer 8.

Although the invention has been described in connection with a specific embodiment, it will be apparent to those skilled in the art that various changes in form and arrangement of parts can be made to suit requirements without departing from the spirit and scope of the invention.

We claim as our invention:

1. A shaped pulse generator comprising a direct current voltage source; a plurality of signal-producing means including respective capacitors for producing respective concurrent sine wave voltages of different frequencies upon discharge of the respective capacitors; means for damping the sine wave voltages produced by the signal-producing means; means for inverting the phase of certain of said sine wave voltages relative to the other; means for effecting charging of said capacitors from said source; means for controlling discharge of said capacitors; and means for combining said sine wave voltages to produce a shaped pulse.

2. A shaped pulse generator comprising a plurality of circuit branches including respective capacitors and inductance coils in series to produce sine wave voltages of different frequencies during discharge of said condensers through said coils; means for effecting charging and discharging of said condensers; and transformer means having a primary winding to which certain of said circuit branches are tapped and a secondary winding to which others of said circuits branches are tapped, wherein the sine wave voltages of different frequency will be combined, damped according to tapping location of said circuit branches, and inverted in phase between primary winding and secondary winding inputs, to produce a shaped voltage pulse appearing across said secondary winding.

3. A shaped pulse generator comprising a first means for producing a first sine wave having a first frequency, second means for producing a second sine wave having a second frequency different than said first frequency, means for combining said first and second waves commencing at a point in time when the output of said first and second means is zero and the rate of change of said waves are opposite in polarity.

4. A shaped pulse generator comprising a first means for producing a first sine wave having a first frequency, second means for producing a second sine wave having a second frequency different than said first frequency, means for combining said waves commencing at a point in time when said first sine wave opposes said second sine wave.

5. A shaped pulse generator comprising a first impedance branch adapted to produce a first sine wave signal having a first frequency, a second impedance branch adapted to produce a second sine wave signal having a second frequency different than said first frequency, means for simultaneously charging said first and second impedance branches, a transformer having first and second windings, said first impedance branch connected to said first winding and said second impedance branch connected to said second winding, and means for simultaneously discharging said first impedance branch through said first winding and said second impedance branch through said second winding in relative directions that invert the phase of said first signal relative to said second signal.

6. A shaped pulse generator comprising a first impedance branch including a first capacitor and a first inductor connected in series relationship, a second impedance branch including a second capacitor and a second inductor connected in series relationship, said first capacitor and inductor having a resonant frequency different than the resonant frequency of said second capacitor and inductor, means for simultaneously charging said first and second impedance branches, a transformer having first and second windings, and means for simultaneously discharging said first impedance branch through said first winding and said second impedance branch through said second winding in relative directions to combine the output of said impedance branches commencing at a point in time when the output of said first impedance branch opposes the output of said second impedance branch.

References Cited in the file of this patent

UNITED STATES PATENTS

| | | |
|---|---|---|
| 2,415,116 | Steifel | Feb. 4, 1947 |
| 2,567,749 | Winter et al. | Sept. 11, 1951 |
| 2,685,644 | Toulon | Aug. 3, 1954 |

Disclaimer 2,990,481.—*Arthur F. Standing*, Baltimore, and *Coleman J. Miller*, Rock Hill Beach, Md. SHAPED PULSE MODULATOR. Patent dated June 27, 1961. Disclaimer filed Apr. 16, 1962, by the assignee, *Westinghouse Electric Corporation.*

Hereby enters this disclaimer to claims 3 and 4 of said patent.

[*Official Gazette May 29, 1962.*]